US012706885B2

(12) United States Patent
Liu et al.

(10) Patent No.: US 12,706,885 B2
(45) Date of Patent: Aug. 11, 2026

(54) COMMUNICATION DEVICE AND METHOD THEREIN FOR FACILITATING IPsec COMMUNICATIONS

(71) Applicant: Telefonaktiebolaget LM Ericsson (PUBL), Stockholm (SE)

(72) Inventors: Daiying Liu, Beijing (CN); Congjie Zhang, Beijing (CN); Qiang Fu, Beijing (CN); Gang Yang, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 114 days.

(21) Appl. No.: 18/704,530

(22) PCT Filed: Oct. 29, 2021

(86) PCT No.: PCT/CN2021/127619

§ 371 (c)(1),
(2) Date: Apr. 25, 2024

(87) PCT Pub. No.: WO2023/070572

PCT Pub. Date: May 4, 2023

(65) Prior Publication Data

US 2025/0023848 A1 Jan. 16, 2025

(51) Int. Cl.
*H04L 9/40* (2022.01)

(52) U.S. Cl.
CPC .......... *H04L 63/029* (2013.01); *H04L 63/101* (2013.01)

(58) Field of Classification Search
CPC ............................ H04L 63/029; H04L 63/101
See application file for complete search history.

(56) References Cited

U.S. PATENT DOCUMENTS 7,907,595 B2 * 3/2011 Khanna ............... H04L 63/0272 370/392
7,962,652 B2 * 6/2011 Jong ..................... H04L 63/164 709/225

(Continued)

FOREIGN PATENT DOCUMENTS

CN 101442471 A 5/2009
CN 103475655 A 12/2013

(Continued)

OTHER PUBLICATIONS

Guide to IPsec VPNs, NIST Special Publication 800-77, Revision 1 by Elaine Barker et al.—Jun. 2020.

(Continued)

*Primary Examiner* — Yonas A Bayou
(74) *Attorney, Agent, or Firm* — Baker Botts L.L.P.

(57) ABSTRACT

The present disclosure provides a method (100) performed by a communication device. The method (100) includes: establishing (110) a first Internet Protocol Security, IPsec, tunnel with a first peer communication device and a second IPsec tunnel with a second peer communication device, the first IPsec tunnel being configured with a first Traffic Selector, TS, that specifies a source address range and a destination address range and has a first priority, and the second IPsec tunnel being configured with a second TS that specifies the source address range and the destination address range and has a second priority lower than the first priority; detecting (120) a failure of the first IPsec tunnel; and removing (130) the first TS for the first IPsec tunnel in response to the failure.

8 Claims, 4 Drawing Sheets

(56) References Cited

U.S. PATENT DOCUMENTS

2007/0192848 A1* 8/2007 Jong ........................ H04L 61/00
726/14
2008/0080509 A1* 4/2008 Khanna ................... H04L 45/50
370/392
2024/0171546 A1* 5/2024 Hussain .............. H04L 63/0272

FOREIGN PATENT DOCUMENTS

WO WO-2016082412 A1 * 6/2016 ............. H04L 41/00
WO WO-2016155005 A1 * 10/2016 ............ H04W 12/02
WO WO-2018161639 A1 * 9/2018 ........... H04L 63/061
WO WO-2024112650 A1 * 5/2024 ......... H04L 63/0272

OTHER PUBLICATIONS

Internet Key Exchange Protocol Version 2 (IKEv2) by C. Kaufman et al.—Oct. 2014—Internet Engineering Task Force (IETF); Request for Comments: 7296; STD: 79.
PCT Notification of Transmittal of the International Search Report and the Written Opinion of the International Searching Authority, or the Declaration issued for International application No. PCT/CN2021/127619—Apr. 8, 2022.
Protocol Support for High Availability of IKEv2/IPsec by R. Singh, ed et al.—Jul. 2011—Internet Engineering Task Force (IETF); Request for Comments: 6311.

* cited by examiner

COMMUNICATION DEVICE AND METHOD THEREIN FOR FACILITATING IPsec COMMUNICATIONS

PRIORITY

This nonprovisional application is a U.S. National Stage Filing under 35 U.S.C. § 371 of International Patent Application Serial No. PCT/CN2021/127619 filed Oct. 29, 2021 and entitled "Communication Device and Method Therein For Facilitating IPSEC Communications" which is hereby incorporated by reference in its entirety.

TECHNICAL FIELD

The present disclosure relates to communication technology, and more particularly, to a communication device and a method therein for facilitating Internet Protocol (IP) Security (IPsec) communications.

BACKGROUND

The Internet Engineering Task Force (IETF) Request for Comments (RFC) 7296, Internet Key Exchange Protocol Version 2 (IKEv2), which is incorporated herein by reference in its entirety, describes version 2 of the Internet Key Exchange (IKE) protocol. IKE is a component of IPsec used for performing mutual authentication and establishing and maintaining Security Associations (SAs).

IPsec provides confidentiality, data integrity, access control, and data source authentication to IP datagrams. These services are provided by maintaining shared state between the source and the sink of an IP datagram. This state defines, among other things, the specific services provided to the datagram, which cryptographic algorithms will be used to provide the services, and the keys used as input to the cryptographic algorithms.

IKE performs mutual authentication between two parties and establishes an IKE Security Association (SA) that includes shared secret information that can be used to efficiently establish SAs (referred to as child SAs) for Encapsulating Security Payload (ESP) or Authentication Header (AH) and a set of cryptographic algorithms to be used by the SAs to protect the traffic that they carry.

Traffic Selector (TS) payloads (IKEv2 Payload Type) allow endpoints to communicate with their peers to specify the selection criteria for packets that will be forwarded over the established SA.

SUMMARY

In order to ensure the stability and reliability of IPsec traffic, it is often needed to provide redundant protection for an IPsec tunnel (or IKE session). When an IPsec tunnel fails, IPsec traffic are expected to be switched to a backup IPsec tunnel as soon as possible to reduce traffic loss.

One scheme is to fully back up an IPsec tunnel, including complete run time data such as Security Parameter Indexes (SPIs) and sequence numbers of IKE and Child SAs. This method is highly complicated, requires support of IETF RFC 6311, and has high requirements on computational capacity, since necessary information, such as the sequence number, needs to be backed up for every traffic packet).

Another scheme is to configure two (or more) IPsec tunnels to protect each other. This is similar to a backup forwarding channel. Once a currently active IPsec tunnel is down, IPsec traffic can be switched to another IPsec tunnel.

However, the switching operation may take a long time and a large number of traffic packets may be lost. The failure of an IPsec tunnel is typically detected by means of Dead Peer Detect (DPD, referring to RFC 7296), and the time required for detecting such failure may be several minutes. Moreover, the traffic packets need to be switched by refreshing a routing protocol corresponding to a TS to enter a new IPsec tunnel, which may typically take more than 10 seconds.

It is an object of the present disclosure to provide a communication device and a method therein, capable of providing redundant protection for an IPsec tunnel in a more efficient manner.

According to a first aspect of the present disclosure, a method performed by a communication device is provided. The method includes: establishing a first IPsec tunnel with a first peer communication device and a second IPsec tunnel with a second peer communication device. The first IPsec tunnel is configured with a first TS that specifies a source address range and a destination address range and has a first priority, and the second IPsec tunnel is configured with a second TS that specifies the source address range and the destination address range and has a second priority lower than the first priority. The method further includes: detecting a failure of the first IPsec tunnel; and removing the first TS for the first IPsec tunnel in response to the failure.

In an embodiment, the first TS and the second TS may specify one or more of a same protocol identifier, a same source port identifier, and a same destination port identifier.

In an embodiment, the failure may be detected by detecting a reachability of an IP address of the first peer communication device that is used for the first IPsec tunnel.

In an embodiment, the reachability may be detected by means of Bidirectional Forwarding Detection (BFD).

In an embodiment, the operation of establishing the first IPsec tunnel may include creating a first Access Control List (ACL) entry corresponding to the first TS. The first ACL entry may have the first priority. The operation of establishing the second IPsec tunnel may include creating a second ACL entry corresponding to the second TS. The second ACL entry may have the second priority.

In an embodiment, the method may further include: removing the first ACL entry in response to the first TS being removed.

According to a second aspect of the present disclosure, a communication device is provided. The communication device includes a communication interface, a processor and a memory. The memory contains instructions executable by the processor whereby the communication device is operative to perform the method according to the above first aspect.

According to a third aspect of the present disclosure, a computer program is provided. The computer program contains instructions which, when executed by a processor of a communication device, configure the communication device to perform the method according to the above first aspect.

According to a fourth aspect of the present disclosure, a computer-readable storage medium is provided. The computer-readable storage medium has computer-readable instructions stored thereon. The computer-readable instructions, when executed by a processor of a communication device, configure the communication device to perform the method according to the above first aspect.

With the embodiments of the present disclosure, two IPsec tunnels, a primary tunnel and a backup tunnel, can be established, with both tunnels being configured with TSs specifying a same source address range and a same destination address range, and the TS for the primary tunnel having a higher priority than the TS for the backup tunnel. When both tunnels are operating normally, data packets will be forwarded via the primary tunnel as it has a higher priority. When the primary tunnel fails, the TS for the primary tunnel can be removed, such that data packets can be forwarded via the backup tunnel. In this way, the IPsec traffic can be switched from the primary tunnel to the backup tunnel in the event of failure of the primary tunnel in a much quicker and more efficient manner.

BRIEF DESCRIPTION OF THE DRAWINGS

The above and other objects, features and advantages will be more apparent from the following description of embodiments with reference to the figures, in which.

DETAILED DESCRIPTION

As used herein, the term "communication device" refers to any device or node in a wired or wireless communication network. For example, a communication device may be a network device or node, such as an access network node or a core network node. Alternatively, a communication device may be a terminal device, such as a User Equipment (UE), that can access a communication network.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
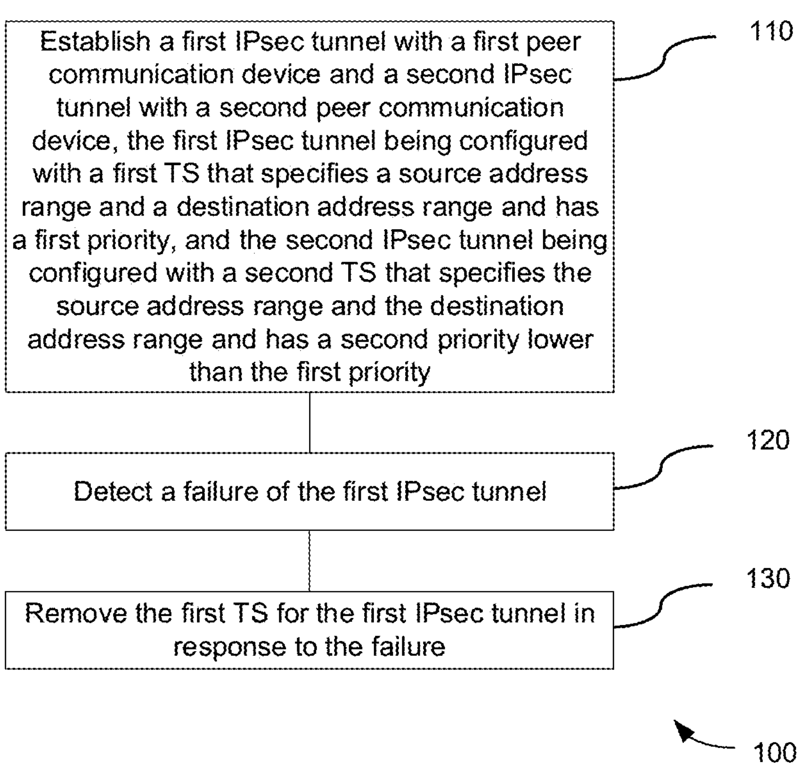
FIG. 1 is a flowchart illustrating a method according to an embodiment of the present disclosure.

FIG. 1 is a flowchart illustrating a method 100 according to an embodiment of the present disclosure. The method 100 can be performed by a communication device, such as a network node, e.g., an IPsec Gateway (GW), or a UE.

At block 110, the communication device establishes a first IPsec tunnel (e.g., a primary tunnel) with a first peer communication device and a second IPsec tunnel (e.g., a backup tunnel) with a second peer communication device. The first IPsec tunnel is configured with a first TS that specifies a source address range and a destination address range and has a first priority. The second IPsec tunnel is configured with a second TS that specifies the source address range and the destination address range and has a second priority lower than the first priority.

In an example, the first TS and the second TS may share a same IP 5-tuple (or some elements thereof). That is, in addition to the same source address range and the same destination address range, the first TS and the second TS may share one or more of a same protocol identifier, a same source port identifier, and a same destination port identifier.

In an example, in the block 110, a first ACL entry corresponding to the first TS may be created, and the first ACL entry may have the first priority. Similarly, a second ACL entry corresponding to the second TS may be created, and the second ACL entry may have the second priority.

At block 120, the communication device detects a failure of the first IPsec tunnel.

In an example, in the block 120, the failure may be detected by detecting a reachability of an IP address of the first peer communication device that is used for the first IPsec tunnel. For example, the reachability may be detected by means of Bidirectional Forwarding Detection (BFD).

At block 130, the communication device removes the first TS for the first IPsec tunnel in response to the failure detected in the block 120.

In an example, the communication device may further remove the first ACL entry in response to the first TS being removed.

Figure 2:
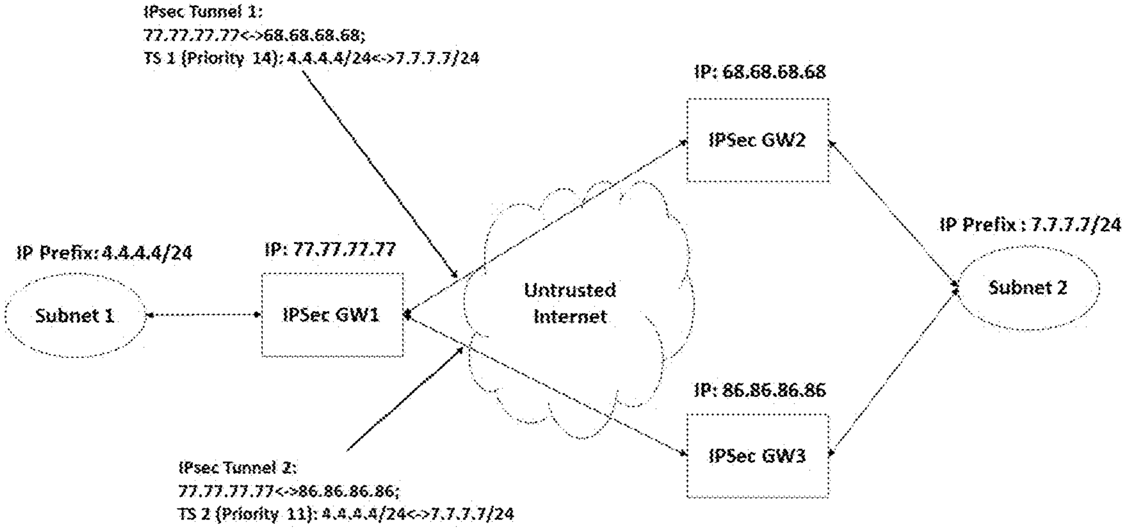
FIG. 2 is a schematic diagram showing a network scenario where the method of FIG. 1 can be applied.

FIG. 2 is a schematic diagram showing a network scenario where the method 100 of FIG. 1 can be applied. As shown, Subnet 1 (4.4.4.4/24) needs to communicate with Subnet 2 (7.7.7.7/24) via the untrusted Internet, so it uses IPsec to ensure the transmission security. IPsec GW1 (77.77.77.77) establishes IPsec Tunnel 1 with IPsec GW2 (68.68.68.68) as a primary tunnel, and establishes IPsec Tunnel 2 with IPsec GW3 (86.86.86.86) as a backup tunnel.

IPsec Tunnel 1 is configured with TS 1 specifying a source address range 4.4.4.4/24 and a destination address range 7.7.7.7/24, and IPsec Tunnel 2 is configured with TS 2 specifying the same source address range 4.4.4.4/24 and the same destination address range 7.7.7.7/24 (in particular, TS 1 and TS 2 may have the same IP 5-tuple or some elements thereof). TS 1 has a priority 14 and TS 2 has a priority 11 (it is assumed here that the priority 14 is higher than the priority 11). At a chip level, i.e., at a switch chip in IPsec GW1, ACL Entry 1 corresponding to TS 1 and ACL Entry 2 corresponding to TS 2 are created. ACL Entry 1 and ACL Entry 2 have the same source address range 4.4.4.4/24 and the same destination address range 7.7.7.7/24 (or the same IP 5-tuple or some elements thereof). Here, ACL Entry 1 has the same priority (14) as TS 1, and ACL Entry 2 has the same priority (11) as TS 2 (the priority 14 is higher than the priority 11).

When both tunnels are operating normally, when a traffic packet from Subnet 1 and destined to Subnet 2 arrives at IPsec GW1, it hits both TS 1 and TS 2 (i.e., it hits both ACL Entry 1 and ACL Entry 2) and is forwarded via IPsec Tunnel 1 to IPsec GW2 since TS 1 (or ACL Entry 1) has a higher priority. When IPsec GW1 detects a failure of IPsec Tunnel 1, e.g., by means of BFD, it can remove TS1 (and ACL Entry 1) for IPsec Tunnel 1. Then, when a traffic packet from Subnet 1 and destined to Subnet 2 arrives at IPsec GW1, it hits TS 2 (or ACL Entry 2) only as TS1 (and ACL Entry 1) has been removed, and is thus forwarded via IPsec Tunnel 2 to IPsec GW3.

FIG. 3A-3D are schematic diagrams showing internal processes in a communication device according to an embodiment of the present disclosure.

The communication device may be e.g., IPsec GW1 in FIG. 2, and the above example described in connection with FIG. 2 will be used in the following description.

Figure 3A:
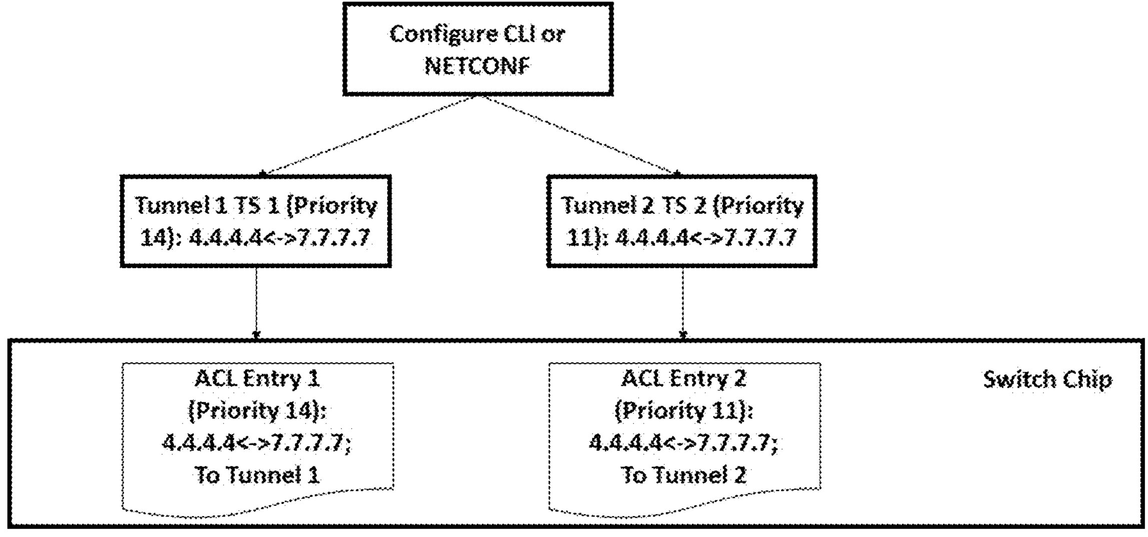
FIG. 3A-3D are schematic diagrams showing internal processes in a communication device according to an embodiment of the present disclosure.

As shown in FIG. 3A, an administrator may configure, via a Command Line Interface (CLI) or using a Network Configuration (NETCONF) protocol, IPsec Tunnel 1 with TS 1 (specifying a source address range 4.4.4.4/24 and a destination address range 7.7.7.7/24, and having a priority 14) and IPsec Tunnel 2 with TS 2 (specifying the same source address range 4.4.4.4/24 and the same destination address range 7.7.7.7/24, and having a priority 11). After a successful TS negotiation, an IKE module (e.g., a software module implemented in IPsec GW1) creates TS 1 and TS 2. Accordingly, the IKE module configures ACL Entry 1 (source address range 4.4.4.4/24, destination address range 7.7.7.7/24, a priority 14) and ACL Entry 2 (source address range 4.4.4.4/24, destination address range 7.7.7.7/24, a priority 11), corresponding to TS 1 and TS 2, respectively, in a switch chip in IPsec GW1.

Figure 3B:
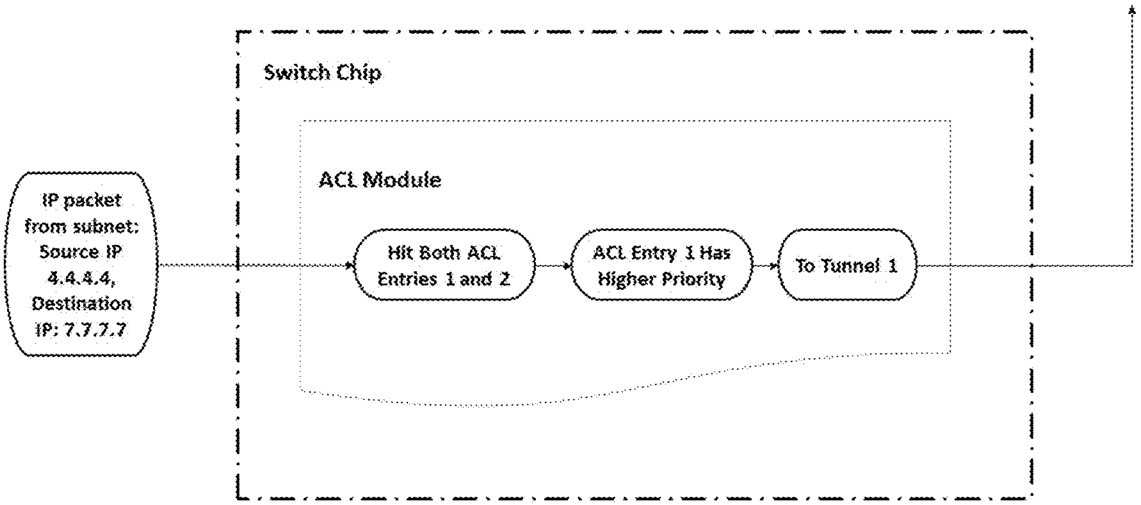

As shown in FIG. 3B, when a traffic packet from Subnet 1 (4.4.4.4) and destined to Subnet 2 (7.7.7.7) arrives at IPsec GW1, it hits both ACL Entry 1 and ACL Entry 2 and is forwarded by an ACL module in the switch chip via IPsec Tunnel 1 since ACL Entry 1 has a higher priority.

Figure 3C:
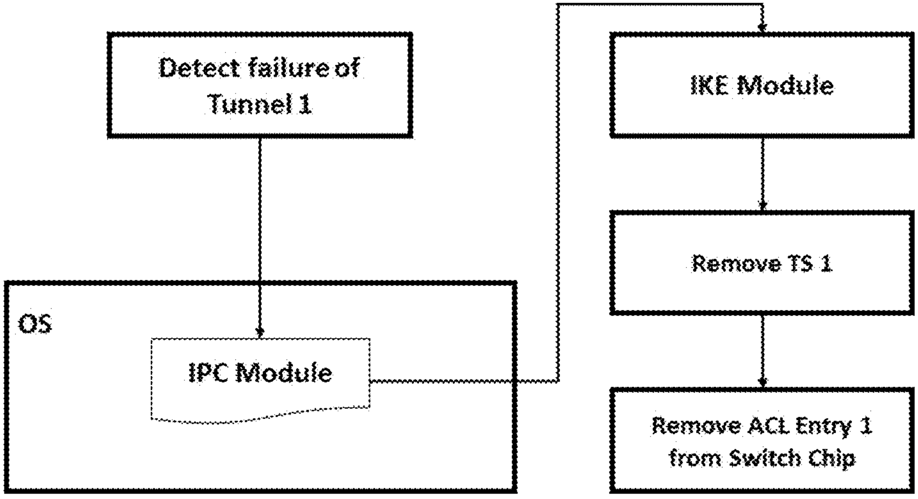

As shown in FIG. 3C, when a detection module (e.g., a BFD module) detects a failure of IPsec Tunnel 1, it can notify the failure event to the IKE module, e.g., using an Inter-Process Communication (IPC) module provided by an Operating System (OS). In response to the failure event, the IKE module can remove TS1 for IPsec Tunnel 1 and configure the ACL module to remove ACL Entry 1 from the switch chip.

Figure 3D:
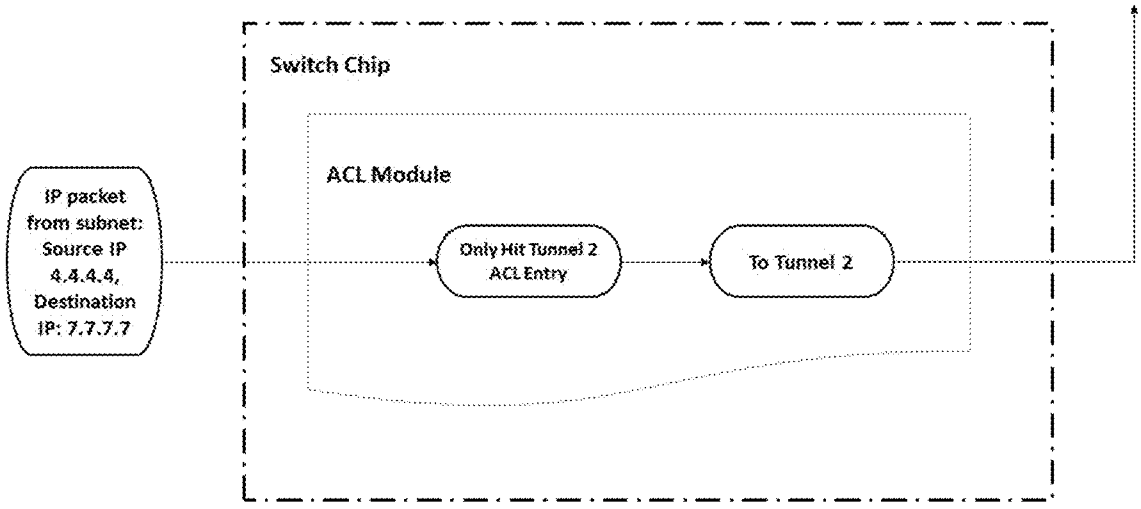

Then, as shown in FIG. 3D, when a traffic packet from Subnet 1 (4.4.4.4) and destined to Subnet 2 (7.7.7.7) arrives at IPsec GW1, it hits ACL Entry 2 only as ACL Entry 1 has been removed, and is thus forwarded by the ACL module via IPsec Tunnel 2.

It is to be noted that the solution according to the present disclosure is interoperable with SA Databases (SADs) not implementing or supporting the solution, e.g., those with multiple TSs/ACL entries for multiple IPsec tunnels having different priorities. Moreover, the solution according to the present disclosure doesn't need any special support from a hardware platform. All the features proposed by the present disclosure can be implemented in a switch chip, a Network Processor (NP) chip, or a Field Programmable Gate Array (FPGA).

Figure 4:
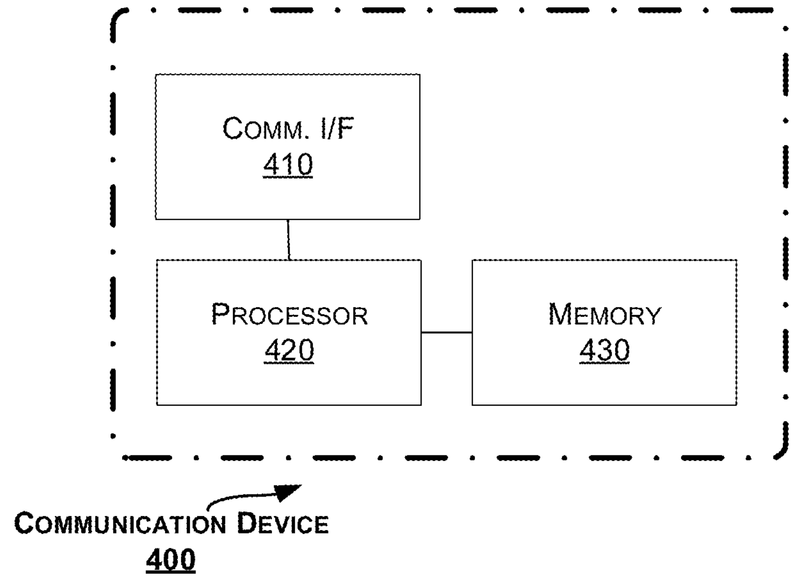
FIG. 4 is a block diagram of a communication device according to an embodiment of the present disclosure.

FIG. 4 is a block diagram of a communication device 400 according to another embodiment of the present disclosure.

The communication device 400 includes a communication interface 410, a processor 420 and a memory 430. The memory 430 may contain instructions executable by the processor 420 whereby the communication device 400 is operative to perform the actions, e.g., of the procedure described earlier in conjunction with FIG. 1. Particularly, the memory 430 may contain instructions executable by the processor 420 whereby the communication device 400 is operative to: establish a first IPsec tunnel with a first peer communication device and a second IPsec tunnel with a second peer communication device. The first IPsec tunnel is configured with a first TS that specifies a source address range and a destination address range and has a first priority, and the second IPsec tunnel is configured with a second TS that specifies the source address range and the destination address range and has a second priority lower than the first priority. The memory 430 may further contain instructions executable by the processor 420 whereby the communication device 400 is operative to: detect a failure of the first IPsec tunnel; and remove the first TS for the first IPsec tunnel in response to the failure.

In an embodiment, the first TS and the second TS may specify one or more of a same protocol identifier, a same source port identifier, and a same destination port identifier.

In an embodiment, the failure may be detected by detecting a reachability of an IP address of the first peer communication device that is used for the first IPsec tunnel.

In an embodiment, the reachability may be detected by means of BFD.

In an embodiment, the operation of establishing the first IPsec tunnel may include creating a first ACL entry corresponding to the first TS. The first ACL entry may have the first priority. The operation of establishing the second IPsec tunnel may include creating a second ACL entry corresponding to the second TS. The second ACL entry may have the second priority.

In an embodiment, the memory 430 may further contain instructions executable by the processor 420 whereby the communication device 400 is operative to: remove the first ACL entry in response to the first TS being removed.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the communication device 400 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method performed by a communication device, comprising:
- establishing a first Internet Protocol Security, IPsec, tunnel with a first peer communication device and a second IPsec tunnel with a second peer communication device, the first IPsec tunnel being configured with a first Traffic Selector, TS, that specifies a source address range and a destination address range and has a first priority, and the second IPsec tunnel being configured with a second TS that specifies the source address range and the destination address range and has a second priority lower than the first priority;
- detecting a failure of the first IPsec tunnel; and
- removing the first TS for the first IPsec tunnel in response to the failure.

2. The method of claim 1, wherein the first TS and the second TS specify one or more of a same protocol identifier, a same source port identifier, and a same destination port identifier.

3. The method of claim 1, wherein the failure is detected by detecting a reachability of an IP address of the first peer communication device that is used for the first IPsec tunnel.

4. The method of claim 3, wherein the reachability is detected by means of Bidirectional Forwarding Detection, BFD.

5. The method of claim 1, wherein
- said establishing the first IPsec tunnel comprises creating a first Access Control List, ACL, entry corresponding to the first TS, the first ACL entry having the first priority,
- said establishing the second IPsec tunnel comprises creating a second ACL entry corresponding to the second TS, the second ACL entry having the second priority.

6. The method of claim 5, further comprising:
- removing the first ACL entry in response to the first TS being removed.

7. A communication device, comprising a communication interface, a processor and a memory, the memory comprising instructions executable by the processor (420) whereby the communication device is operative to perform the method according to claim 1.

8. A computer program comprising instructions which, when executed by a processor of a communication device, configure the communication device to perform the method according to claim 1.

* * * * *